United States Patent [19]

Hsu et al.

[11] Patent Number: 4,514,532
[45] Date of Patent: * Apr. 30, 1985

[54] MODIFIED PHENOL-FORMALDEHYDE RESIN AND THE PRODUCTION THEREOF

[75] Inventors: Oscar H. H. Hsu; Milford C. Tassler, both of St. Charles, Ill.

[73] Assignee: Masonite Corporation, Chicago, Ill.

[*] Notice: The portion of the term of this patent subsequent to Feb. 21, 2001 has been disclaimed.

[21] Appl. No.: 581,287

[22] Filed: Feb. 17, 1984

Related U.S. Application Data

[63] Continuation-in-part of Ser. No. 334,881, Dec. 28, 1981, Pat. No. 4,433,126.

[51] Int. Cl.$^3$ .................... C08H 5/04; C08G 83/00
[52] U.S. Cl. .................................. 524/14; 524/15; 524/78; 527/103; 527/105; 528/1; 156/335; 428/528; 428/529
[58] Field of Search .............. 524/13, 14, 15, 78; 528/1, 129; 527/103, 105; 156/327, 335; 428/528, 529

[56] References Cited

U.S. PATENT DOCUMENTS 3,965,056  6/1976  Stout et al. .................... 524/15
4,311,621  1/1982  Nishizawa et al. ............. 524/15

*Primary Examiner*—John Kight
*Assistant Examiner*—Nathan M. Nutter
*Attorney, Agent, or Firm*—Mason, Kolehmainen, Rathburn & Wyss

[57] ABSTRACT

A modified phenol-formaldehyde binding resin is particularly useful in the formation of man-made boards including bonded fibers, fibrous particles, and a plurality of uniformly, or randomly shaped pieces, masses or sheets bonded together with the modified phenol-formaldehyde binding resin. The resin binder is especially adapted to bonding wood fibers and particles, comprising the condensation product of a phenol, formaldehyde and a water-soluble carbohydrate-phenol complex from steam digestion of wood chips, and the production thereof. Various objects can be manufactured using these resins, such as particle objects and objects or sheet materials made by bonding together a plurality of uniformly or randomly shaped masses, for example, fiberboards such as hardboard and insulation board; particle board; plywood; oriented strand board; and waferboard.

20 Claims, No Drawings

MODIFIED PHENOL-FORMALDEHYDE RESIN AND THE PRODUCTION THEREOF

CROSS REFERENCE TO RELATED APPLICATION

This application is a continuation-in-part of my prior application filed Dec. 28, 1981 now U.S. Pat. No. 4,433,126.

FIELD OF THE INVENTION

This invention relates to a modified phenol-formaldehyde binding resin particularly useful in the formation of man-made boards including bonded fibers, fibrous particles, and a plurality of uniformly, or randomly shaped pieces, masses or sheets bonded together with the modified phenol-formaldehyde binding resin. More particularly it relates to a resin binder, especially adapted to bonding wood fibers and particles, comprising the condensation product of a phenol, formaldehyde and a water-soluble carbohydrate-phenol complex from steam digestion of wood chips, and the production thereof. The present invention also relates to the method of manufacturing fibrous objects, particle objects and objects or sheet materials made by bonding together a plurality of uniformly or randomly shaped masses, for example, fiberboards such as hardboard and insulation board; particle board; plywood; oriented strand board; and waferboard, using this novel resin binder and to the method of manufacturing these articles.

BACKGROUND OF THE INVENTION

Hardboard, particle board and similar manmade board products are commonly produced from wood fibers and/or particles which are conventionally bonded into panels with thermosetting resins such as phenol-formaldehyde bonding agents. In the dry process for hardboard production, ligno-cellulosic fibers are first coated with a thermosetting resin binder, such, as a phenol-formaldehyde resin, and are then randomly distributed into a mat by air blowing the resin-coated fibers onto a support member. The mat is pressed at temperatures up to about 450° F. and pressures less than about 1000 p.s.i. to compress the mat into an integral consolidated structure and to cure the thermosetting resin. In the wet process for hardboard production, ligno-cellulosic fibers are uniformly blended with water in a series of stock chests to form a slurry. Usually resin binders such as phenol-formaldehyde are added to the slurry where the resin is flocculated and deposited on the fiber surfaces. The slurry is then deposited onto a water-pervious support member, similar to a Fourdrinier wire, where much of the water is removed, leaving a wet mat of ligno-cellulosic material. The wet mat is transferred from the pervious support member and consolidated under heat and pressure to form the board. Typically, pressures of from 400 to 500 p.s.i. and temperatures up to about 450° F. are encountered in consolidation of a man-made board manufactured by the wet process.

The resin binders represent a substantial part of the cost of insulation boards, fiberboards, such as hardboard, particle board, plywood, oriented strand board, wafer board, or similar wood products and it has long been desired to reduce this cost factor. Usually costs have been reduced by decreasing the amounts of binder in the hardboard or wood product.

OBJECTS OF THE INVENTION

It is an object of this invention to provide an inexpensive resin binder for wood products, and a method for its production. It is another object to provide a phenol-formaldehyde resin binder which is less expensive than resin binders made from phenol and formaldehyde. It is a further object to provide a hardboard product which has physical characteristics comparable to and yet is less expensive than conventional hardboard made with unmodified phenol-formaldehyde binder. These and other objects are apparent from and are achieved in accordance with the following disclosure.

GENERAL DESCRIPTION OF THE INVENTION

This invention comprises a thermosettable resin binder composed of phenol, formaldehyde and a water-soluble complex of phenolic and carbohydrate components from steam digestion of wood chips. It also comprises the method of producing said resin binder and the man made boards and method of making the man-made boards using the novel resin binder, including hardboard, chip board, particle board, panel board, acoustical board, insulation board, plywood, oriented strand board and wafer board and the like.

In accordance with this invention, an aqueous solution of the water-soluble complex of phenolic and carbohydrate components from steam digestion of wood chips, evaporated (concentrated) to a heavy brown liquid containing 56% to 62% solids by weight, is one of the components of a phenol-formaldehyde resin binder formulation. The water-soluble complex of phenolic and carbohydrate components typically contains 45–68% by weight of hemicellulose and monosaccharides, 18–35% by weight of water-soluble phenolic compounds, 3.8–8.75% ash and 4–5% acidic compounds.

In accordance with another important feature of the present invention, the lignosulfonate modified phenol-formaldehyde resin of the present invention can be used to bind fibers, fibrous particles, and uniformly or randomly shaped masses in the production of fiberboard and other fibrous articles, such as hardboard; insulation board; fiberglass mats; lamination of sheet materials, such as in the manufacture of plywood; and in bonding together a plurality of discrete, uniformly or randomly shaped members, particularly fibrous members, such as in the manufacture of oriented strand board and waferboard, to provide new and unexpected strength, water resistance and dimensional stability.

AQUEOUS CARBOHYDRATE-PHENOLIC CONCENTRATE FROM WOOD

The unique component of the phenol-formaldehyde binder of this invention is a concentrated aqueous extract of carbohydrate and phenolic materials from the steam digestion (explosion) of wood chips, without chemical addition, by the procedures of the Mason U.S. Pat. Nos. 1,812,970 and 1,824,221. The process water from the wet process hardboard manufacturing procedure contains soluble carbohydrate and phenolic materials at a solids content from about 2.5% to 3.5%. This liquor, at a temperature of about 120° F., is fed into a series of four Swenson vacuum evaporators and four Vulcan vacuum evaporators. Steam at 250 p.s.i. flows through the evaporators in opposite direction to the flow of liquor. The concentrated liquor from the last Vulcan evaporator has a solids content of about 35% and a temperature of about 180° F. This then enters a Parkinson evaporator at high vacuum (27-28 inches of mercury) at 140 p.s.i. steam pressure. The effluent from the evaporator has a solids content of about 45% to 65%, preferably 56% to 62%. The overall heat contact time in the evaporators is about 30 to 45 minutes.

The effluent described above has a pH which may vary from 4.15 to 5.40, depending on the type of wood treated. The preferred pH range is from 4.6 to 4.8. Other properties include the following ranges:

Specific gravity (a function of solids content): 1.230 to 1.290 (at 45% to 65% solids content)

Viscosity (proportional to solids content and temperature): 440 to 8,500 centipoises (at 45% to 65% solids content, pH level, and 25° C.), usually 1000 to 2500 cps.

Reducing sugars: 2 to 5 percent (without hydrolysis), 45 to 68 percent (with hydrolysis)

Carbohydrates: 45 to 68 percent

Phenolic constituents: 18 to 35 percent

Other Components:

a. Inorganic material (ash): 3.80 to 8.75 percent, including elements distributed as follows:

| Element | Percent of Total Solids |
|---|---|
| Aluminum | 0.018-0.032 |
| Magnesium | 0.027-0.290 |
| Calcium | 0.660-1.030 |
| Iron | 0.027-0.043 |
| Sodium | 0.960-1.070 |
| Manganese | 0.084-0.096 |
| Silicon | 0.260-0.330 |
| (as dioxide) | |
| | 2.036-2.891 |

Ash, uronic acids, fibers, and the like: 8-15%

The carbohydrates include simple sugars (monosaccharides) 2-5% and hemicellulose 43-63%. The carbohydrate fraction is composed of:

| | |
|---|---|
| Glucose | 5-15% |
| Mannose | 7-40% |
| Galactose | 4-13.5% |
| Arabinose | 5-6.5% |
| Xylose | 77-24% |
| Rhamnose | 2-1% |

Pentoses comprise about 32-84% of the sugars and hexoses about 16-68%.

The phenolic components resulting from the decomposition of lignin are substituted phenols derived from the propylmethoxyphenol units or nuclei of lignin. Lignin from wood contains two primary nuclei, in differing ratios for softwood and for hardwood. The first is the 3-methoxy-4-hydroxyphenylpropane nucleus; the second is the 3,5-dimethoxy-4-hydroxyphenylpropane nucleus. In softwood the ratio of 3-methoxy-4-hydroxyphenyl units to 3,5-dimethoxy-4-hydroxyphenyl units is about 10:1. In hardwood the ratio is about 1:1. On decomposition, the 3-methoxy-4-hydroxyphenylpropane nucleus provides a series of 3-methoxy-4-hydroxyphenyl compounds including guaiacol, 4-hydroxy-3-methoxybenzaldehyde, coniferyl alcohol, 4-methylguaiacol, 4-ethylguaiacol, isoeugenol, vanillin, and vanillic acid. Decomposition of the 3,5-dimethoxy-4-hydroxyphenylpropane nucleus provides a series of 3,5-dimethoxy-4-hydroxyphenyl compounds, including sinapyl aldehyde, sinapyl alcohol, sinapic acid, syringol, 4-methylsyringol, 4-ethyl-syringol, syringaldehyde, and syringic acid. Other decomposition products of lignin in the liquor include catechol, cresol, p-propylphenol, anisaldehyde, p-hydroxybenzaldehyde, and anisic acid.

DETAILED DESCRIPTION OF THE INVENTION

By the procedure of this invention it is possible to replace from 5% up to 50% of the phenol of a phenol-formaldehyde resin with a concentrated aqueous complex of phenolic and carbohydrate components from steam digestion of wood chips, said complex containing 56% to 62% solids. Ordinarily the phenol-formaldehyde resol resins are produced by reacting phenol with an excess of formaldehyde under basic conditions. Usually the mole ratio of phenol to formaldehyde is in the range from 1:2.0 to 1:3.0. The low molecular weight phenol-formaldehyde resin thus produced is homogeneous and soluble in alkaline water. It is added to the fiber slurry, as in the previously mentioned stock chest, where it flocculates and deposits on the fibers. The wet lap formed from the fiber slurry is consolidated under heat and pressure. During the latter step the resin sets to an infusible rigid resin which assists in binding the wood fibers into hardboard.

The concentrated (56-62% solids) aqueous extract of phenolic and carbohydrate components from the steam digestion of wood chips is equivalent to and can replace, on a dry weight basis, an equal weight of phenol in the phenol-formaldehyde resin, up to a maximum of about 50% of the dry weight of the phenol. Thus, a resin mix which ordinarily contains 1000 grams of phenol (dry weight) can be produced in equivalent form with from 50 grams up to 500 grams of the phenol (dry weight) replaced by the same weight of the concentrated aqueous extract from wood chips, determined on a dry weight basis. For example, if 500 grams of phenol (dry weight) are to be replaced, the amount of aqueous extract from wood chips (containing 60% solids) to replace the 500 grams of phenol would be 833.3 grams. In other respects the resin is not modified. The calculation of the mole ratio of phenol to formaldehyde is made on the basis that in this example 833.3 grams of the aqueous extract is equivalent to 500 grams of phenol and represents 5.31 moles.

The mixture of phenol and aqueous extract of wood is combined with aqueous formaldehyde, adjusted to pH in the range from 8.0 to 12.2, preferably 9.0 to 12.0, and maintained at 70°-100° C. until the viscosity reaches the desired level (10-5000 centipoises, Brookfield). There is thus produced a resin having good shelf life suitable as a binder for hardboard.

Resins polymerized in accordance with the present invention to a viscosity in the range of about 10 centipoises to about 5000 centipoises will provide new and unexpected bonding between fibers; fibrous particles; sheet materials, particularly fibrous sheet materials such as wood veneers laminated to manufacture plywood; and masses of uniformly or randomly shaped discrete members such as wood sheet portions or strips bonded in the manufacture of sheet materials such as oriented strand board and waferboard. The lower viscosities, e.g. 10 to 500 centipoises are preferrable for use as binders in initial consolidation of individual fibers or smaller discrete pieces, such as in the initial consolidations of fiber in the manufacture of fiberboard, particle board and insulation board. The higher viscosity resins, e.g. 500 to 1500 centipoises are most appropriate for binding together a plurality of discrete masses or sheet material, such as in the manufacture of plywood, oriented strand board, and waferboard. When the resins of the present invention are used in the wet process to manufacture fiberboard or other water-laid fibrous sheets, e.g. resins having a viscosity of about 10 to about 500 centipoises, they will precipitate out of forming water, having a pH of about 5 or less, onto the fibers to provide new and unexpected bonding strength and bonding maintenance as evidenced by the internal bond, modulus of rupture and boil swell data.

To achieve the full advantage of the present invention when the resins are used to bond discrete masses, particularly fibrous masses, such as in the manufacture of plywood, oriented strand board and waferboard, polymerization should be terminated when the reaction mixture reaches a viscosity in the range of about 300 centipoises to about 3500 centipoises, measured at a pH of 10.95±0.2. Resins of the present invention prepared by terminating polymerization at a viscosity of about 10 to about 500 centipoises, and preferably about 20 to about 300 centipoises have provided new and unexpected bonding when used as a binder in the initial formation or consolidation of fibrous products, such as fiberboard, and insulation board.

Polymerization can be terminated in any manner, such as by cooling the reaction mixture to about room temperature and diluting the mixture to about 20% solids, as set forth in Example 1. Dilution to about 10% to about 30% solids slows resin aging by slowing further polymerization to lengthen resin shelf life to at least about 1 month at room temperature.

The resin of example 1 was then compared to a typical phenol-formaldehyde resin in the manufacture of a fiberboard using typical binder incorporation levels of ¾% and 1.5%. It was found that the fiberboard manufactured with the resin binder of the present invention had new and unexpected physical characteristics of strength, water resistance and dimensional stability as indicated by the test data set forth in Table I.

The invention is further disclosed by the following examples which illustrate the production of modified phenol-formaldehyde resin binder materials. It will be understood by those skilled in the art that numerous modifications in quantities, operating conditions and the like may be made without departing from the invention as herein disclosed.

EXAMPLE 1

In a reactor were placed 793.5 grams of the previously described concentrated aqueous extract of wood (58 percent solids), 315.7 grams water, and 86.9 grams formaldehyde (37 percent). The mixture was agitated for ten minutes, followed by the addition of 48.4 grams 50 percent sodium hydroxide solution as a catalyst. The solution was heated to 75° C. and held for one hour. The viscosity of this resulting prepolymer after this treatment was approximately 40 centipoises (25° C.) and approximately 9.60 pH. This solution is used as component "A" of the final resin.

In another reactor were loaded 530.7 grams phenol (90 percent) and 1,072.6 grams formaldehyde (37 percent), forming a solution with a phenol-formaldehyde mole ratio of 1:2.6. Then 62.2 grams of 50 percent sodium hydroxide solution was added with agitation over a period of ten minutes, the addition being done carefully to avoid overheating beyond 80° to 85° C. in one-half hour. The reaction mixture was maintained at 80° to 85° C. for another one-half hour and cooled to 70° C. Then 62.2 grams of 50 percent sodium hydroxide solution were added slowly with agitation. The final alkalinity level was 7.10 percent, based on the overall weight of reactant. The resulting solution was heated to 80° to 85° C. until the viscosity reached 75 centipoises (25° C.). This prepolymer solution had the following properties at 25° C.:

Specific Gravity: 1.187
Viscosity: 75 cps
pH: 10.4
Refractive Index: 1.4680

The floc test was conducted by dropping a few drops of the prepolymer solution into very dilute acetic acid (pH 3.0); the solution turned immediately into a white, milky liquid with a brown precipitate, which indicated the product had a low molecular weight and high reactivity.

To this solution (1,727.7 grams) was added 1,000 grams water and 1,244.5 grams of the Component A, which was made and described above. As soon as the mixture was blended, 366.9 grams of 50 percent sodium hydroxide solution and 186.0 grams of formaldehyde (37 percent) were introduced into the reactor. The total alkalinity was 5.81 percent, based on the total solution at 32.5 percent solids basis. The temperature was raised to 90° to 92° C. until a viscosity of 50 centipoises was reached. The mixture was then cooled to 80° C. for easy control of the resin advancement. It was found that the final resin viscosity of 100 centipoises at this reaction stage would serve as the best resin. As soon as the viscosity reached 100 centipoises, the resin was cooled to 35° C. For improving the drainage ability of this resin, an additional 25 grams of phenol were added to the solution, the temperature was raised to 45° C., and held for one-half hour.

The resulting resin should have the following physical properties:

- Solids Content: 32.5%
- pH (at 25° C.): 11.3–11.6
- Viscosity (at 25° C.): 10 to 1000 cps, preferably 200–350 cps
- Alkalinity: 5.6–5.9%
- Flocculation (at 85° C.): Floc with clear supernatant.

This resin has a shelf life of two weeks at 40° C. This resin can be diluted with water to the 21 percent solids level to further stabilize it. The resulting modified phenol-formaldehyde resin was found to be effective as a binder for ⅛, ¼, ⅜, 7/16, ½inch and other thickness hardboard; the results for 7/16-inch hardboard are described in Table 1.

TABLE 1

Tabulation of hardboard properties with conventional phenol-formaldehyde resin versus modified phenol-formaldehyde resin

| Binder System | Specific Gravity | Average* Modulus of Rupture (psi) | 24-Hour Soak Percent Water Absorption | 24-Hour Soak Percent Caliper Swell |
|---|---|---|---|---|
| Control PF Resin | 0.96 | 3,091 | 7.47 | 5.13 |
| Modified PF Resin-1** | 0.94 | 3,886 | 7.38 | 4.24 |
| Modified PF Resin-2** | 0.93 | 2,906 | 8.84 | 5.16 |
| Modified | 0.93 | 3,318 | 9.73 | 4.44 |

TABLE 1-continued

Tabulation of hardboard properties with conventional phenol-formaldehyde resin versus modified phenol-formaldehyde resin

| Binder System | Specific Gravity | Average* Modulus of Rupture (psi) | 24-Hour Soak Percent Water Absorption | Percent Caliper Swell |
|---|---|---|---|---|
| PF Resin-3** | | | | |

1.5 percent resin binder
*Average of three boards
**-1, -2, -3,: Modified phenol-formaldehyde resin from different batches 7/16-inch thick hardboard 400° F. core temperature

EXAMPLE 2

Into a reactor were loaded 432.2 grams of phenol (100 percent), 1,173.9 grams of water, and 682.4 grams of the previously described concentrated wood extract (58 percent solids). To this mixture was slowly added caustic soda (348.1 grams of 50 percent aqueous solution) and the mixture was heated to 85° C. for two hours, then cooled to 60° C. Formaldehyde (642.1 grams of 50 percent aqueous solution) was added slowly with good agitation and the temperature of the mixture was held at 90° C.

Then 214 grams of formaldehyde (50 percent) and 391.3 grams of water were added and the mixture held at 90° C. until the viscosity reached 50 centipoises (Brookfield). The mixture was held at 80° C. until 125 centipoise viscosity (Brookfield) was reached.

The resin so formed had the following properties:
Solids Content: 32.5%
pH: 11.4
Viscosity (25° C.): 125 cps
Alkalinity: 5.7%
Flocculation (85° C.): Floc with clear supernatant This resin has a shelf life of two weeks at 40° C. If its pH is raised to 11.6 by adding 50 percent caustic soda, the shelf life can be extended to one month without a reduction in properties. The resulting modified phenol-formaldehyde resin was found to be effective as a binder for $\frac{1}{8}$, $\frac{1}{4}$, $\frac{3}{8}$, 7/16, $\frac{1}{2}$-inch, and other thickness hardboard; the results for 7/16-inch hardboard are described in Table 2.

TABLE 2

Tabulation of hardboard properties with conventional phenol-formaldehyde resin versus modified phenol-formaldehyde resin

| Samples | Specific Gravity | Modulus of Rupture (psi) | 24-Hour Soak Percent Water Absorption | Percent Caliper Swell |
|---|---|---|---|---|
| Control PF Resin-1 | 0.94 | 3,400 | 22.53 | 4.18 |
| Control PF Resin-2 | 0.88 | 3,700 | 17.97 | 3.64 |
| Control PF Resin-3 | 0.89 | 4,700 | 17.43 | 3.32 |
| Control PF Resin-4 | 0.94 | 4,600 | 19.56 | 3.21 |
| Modified PF Resin-1 | 0.95 | 3,900 | 19.14 | 3.64 |
| Modified PF Resin-2 | 0.85 | 3,400 | 18.57 | 3.83 |
| Modified PF Resin-3 | 0.90 | 4,200 | 18.13 | 3.53 |
| Modified PF Resin-4 | 0.94 | 4,800 | 19.13 | 3.64 |

1.5 percent resin binder
-1, -2, -3, and -4: resin from different batches 7/16-inch thick hardboard 300° F. core temperature

EXAMPLE 3

Into a reactor were loaded 1,983.5 grams of formaldehyde (37 percent), 567.1 grams of the previously described concentrated wood extract (58 percent solids), 767.6 grams of phenol (100 percent), and 1,207 grams of water. To this mixture was slowly added with good agitation over a period of 45 to 50 minutes, 399.2 grams of caustic soda (50 percent). The mixture was warmed to 90° C. and maintained for two hours, then cooled to 30° C.

The resin so formed had the following physical properties:
Solids Content: 36%
pH: 10.0
Viscosity (25° C.): 40 seconds No. 1 Zahn Cup
Alkalinity: 5.0%
Flocculation (85° C.): Floc with clear supernatant This resin has a shelf life of two weeks at 40° C.; however, if the solids content is reduced to approximately 20 percent, the shelf life is extended beyond one month without a reduction in properties. The resulting modified phenol-formaldehyde resin was found to be an effective binder for $\frac{1}{4}$, $\frac{1}{8}$, $\frac{3}{8}$, and 7/16-inch and other thickness hardboard. The results for 7/16-inch hardboard are described in Table 3.

TABLE 3

Tabulation of hardboard properties with conventional phenol-formaldehyde resin versus modified phenol-formaldehyde resin

| Samples | Specific Gravity | Modulus of Rupture (psi) | 24-Hour Soak Percent Water Absorption | Percent Caliper Swell |
|---|---|---|---|---|
| Control PF Resin-1 | 0.909 | 3,640 | 9.74 | 5.04 |
| Modified PF Resin-1 | 0.915 | 4,102 | 10.00 | 7.00 |

1 percent resin binder
7/16-inch thick hardboard 400° F. core temperature

BONDING OF A PLURALITY OF DISCRETE MASSES, PARTICULARLY, FIBROUS MASSES, SUCH AS IN THE MANUFACTURE OF LAMINATES, E.G. PLYWOOD ORIENTED STRAND BOARD AND WAFERBOARD

The modified phenol-formaldehyde resins of the present invention generally are useful as binders in any environment where phenol formaldehyde binding resins have been used. Examples of such uses include the manufacture of laminates, such as in the manufacture of plywood, and in the bonding together of discrete uniformly or randomly shaped members, particularly fibrous members, such as in the manufacture of chip board, particle board, oriented strand board and waferboard. In the manufacture of such products, the binding resin is disposed between closely adjacent discrete pieces, particles or members to securely bond the discrete particles or members by sandwiching a layer or area of binder between the two closely adjacent particles or members. Some products, such as chip board, particle board and oriented strand board are manufactured by completely coating the discrete particles or members to be adhered together with a layer of wet, viscous, i.e. 300 cps, resin binder and pressing or molding the members into a desired shape under heat and pressure to cure the binder while pressing the adjacent particles or members into close contact.

In the manufacture of waferboard, the binder is used in a dry or powder form sporatically over the wafers or fibrous pieces, instead of providing a complete coating to provide distinct areas of bonding between closely adjacent members, similar to spot welds in metal. The manufacture of fibrous sheet materials from smaller fibrous portions such as chip board, particle board, oriented strand board and waferboard is becoming increasingly important with the dwindling supply of trees suitable for peeling into continuous sheets, e.g. wood veneer as used in making plywood. The resins of the present invention are useful in the same manner and generally in the same amounts as phenol formaldehyde binding resins in manufacturing sheet materials such as particle board, oriented strand board, waferboard, and plywood as well as in binding together individual fibers as in the manufacture of fiberboards such as hardboard and insulation board (wet and dry process); fiberglass woven and non-woven mats and the like.

EXAMPLE 4

A resin was prepared as described in Example 1 using the following components:

| Concentrated wood extract of Example 1 (60% solids) | 472.8 grams |
|---|---|
| Phenol (90% solids) | 601.4 grams |
| Formaldehyde (37% solids) | 1540.5 grams |
| Sodium hydroxide (50% solids) | 414.9 grams |
| | 3007.9 grams total |

The wood extract, phenol and sodium hydroxide were mixed, as described in Example 1, and heated to 85° C. and held at 85° C. for one hour. The mixture was then cooled to 70° C. and one third of the formaldehyde then added and mixed until the temperature of the reaction mixture rose to 85° C. The reaction mixture was held at 85° C. for 40 minutes and was then cooled to 70° C. Another one third of the formaldehyde was added and the temperature rose to 85° C. The reaction mixture was held at 85° C. for 30 minutes. The final one third of the formaldehyde was then added at 85° C. and the reaction mixture was held at 85° C. As the reaction progressed, the viscosity of the reaction mixture was monitored and samples were removed and cooled to halt the reaction of each sample, at viscosities of 160 cps., 415 cps., 1500 cps and 3200 cps. The resins had a final pH of 10.95 and 42% solids.

ORIENTED STRAND BOARD (OSB) MANUFACTURE

Oriented strand board (OSB) is manufactured from a plurality of discrete generally oriented strands or strips of wood hot pressed together using a binder, such as a phenol formaldehyde resin. The pieces or strips of wood are, for example, plywood or veneer strips having a width of about ¼ inch to ⅜ inch, a length of about 2½ inches to about 3 inches and a thickness of about 20 mils. The strips of wood are coated, such as by spraying, with a liquid resin glue and generally oriented so that the fiber direction is approximately the same. The resin coated, oriented strips are disposed into a press or mold so that the strips are in contact with other strips both vertically and horizontally so that when pressed, under heat and pressure, the strips are compressed tightly against other contacting strips to adhere the strips together and to mold a sheet of material having desired dimensions. The strands or strips of wood material are not perfectly aligned in one fiber direction (approximately ±20° from a single direction) so that some strips overlap other adjacent strips for stronger adhesion.

Oriented strand board is manufactured having the fibers generally oriented in a length or machine direction or manufactured having the fibers generally oriented in the width or cross-machine direction. Other oriented strand boards are manufactured having a central or core layer including about 50% by weight of the fibers generally oriented in a width or cross-machine direction and having upper and lower layers (each about 25% by weight of total board fibers) generally oriented in a length or machine direction. The resin coated strands having fibers generally aligned in a single direction or having multiple layers of resin coated strands where adjacent layers have fibers aligned generally at a right angle, are hot pressed to form a sheet of predetermined dimensions. Industry standards require that oriented strand boards achieve given values for modulus of rupture (both parallel to and perpendicular to orientation); modulus of elasticity (both parallel to and perpendicular to orientation); and internal bond.

To show that the resins of the present invention are suitable for oriented strand board (OSB) manufacture, twelve OSB samples were made using the resin manufactured, as described above (42% solids) polymerized to have a viscosity of about 300 cps., as the resin binder. The samples were constructed in three layers having a core comprising about 50% by weight of total fiber oriented in the width or cross-machine direction and having two face layers each comprising about 25% by weight of total fiber oriented in the length or machine direction. The fiber strips are Aspen veneer strips having dimensions of about ¼"×2"×0.020" and having a moisture content of 7% by weight. The resin of Example 1 is sprayed onto the strips in an amount of 6% by weight of fibers. The oriented, resin coated strands were pressed in a platen press at 375° F. and 1400 psig for 3 minutes and the pressure reduced to 120 psig to finish the total pressing time of 7 minutes. The samples have a finished density of 42 pounds/ft$^3$. The samples prepared have dimensions of 17 inches×17 inches×½ inch.

The data of Table 6 demonstrates that the OSB samples manufactured as above and tested generally exceed the industry standards.

TABLE 6

| | ORIENTED STRAND BOARD | | | |
|---|---|---|---|---|
| Test | Industry Standard | Range | Avg. | No. of Samples |
| Modulus of Rupture to orientation (psig) | 3500 | 2795–4766 | 3512 | 3 |
| Modulus of Rupture to orientation (psig) | 5000 | 5165–6051 | 5607 | 3 |
| Modules of Elasticity to orientation (psig) | 400 × 10$^3$ | 351,000–602,000 | 459 × 10$^3$ | 3 |
| Modulus of Elasticity to orientation (psig) | 800 × 10$^3$ | 721,000–866,000 | 812 × 10$^3$ | 3 |
| Internal bond (psig) | 80 | 81.5–122 | 100.2 | 12 |

PLYWOOD MANUFACTURE

Plywood is manufactured by peeling a tree into a long veneer, for example Southern Pine or Douglas fir, cutting the veneer to a given dimension, i.e. 4 ft by 8 ft, and laminating a plurality of the cut veneers, under pressure, with one or more intermediate layers of a binder, e.g. a phenol formaldehyde glue formulation. The adjacent veneers of plywood are oriented so that the fiber grain direction of alternate veneers are at right angles when laminated together. The glue formulation, including a resin having a viscosity of about 300 centipoises is spread between adjacent plywood veneers at a rate of about 20 grams/ft$^2$ where the glue formulation includes about one third by weight resin and the remainder comprises water, extenders, fillers and the like to achieve a suitable glue formulation. Industry standards require plywood to achieve a value of at least 80 when tested for lap shear, measured as a percent wood failure.

To show that the resins of the present invention are suitable for plywood manufacture, one hundred and sixty plywood samples of three ply construction were made using the resins of Example at viscosities of 160 cps; 415 cps; 1500 cps and 3200 cps in the glue formulation shown in Table 4:

glue formulations to test samples at 10 gms/ft.$^2$ and 20 gms/ft.$^2$ glue application rates using glues made from resins at each of the four sample viscosities. The plywood samples were made using southern pine veneers having a moisture content of 7% by weight and a glue spread rate of 10 grams/ft.$^2$ or 20 grams/ft$^2$ at each interface. The one hundred and sixty plywood samples each have dimensions of 12 inches × 12 inches × ½ inch. The center veneer of each sample is oriented so that its fiber grain direction is perpendicular to the fiber grain direction of the upper and lower face veneers. The three plys are laminated in a platen press at a temperature of 300° F. and a pressure of 225 psig for 8 minutes. The data of Table 5 show that almost all one hundred and sixty plywood samples laminated using the glue formulations of Table 4 met or exceeded the industry standard for lap shear tested both dry and wet:

TABLE 5

3 Ply Plywood Made With Glue Formulations of Table 4 - Resin
Viscosities of 160 cps.; 415 cps., 1500 cps and 3200 cps.; 10 or 20 gms/ft$^2$
At Each Interface

|  | Spread Rate g/ft.$^2$ | 160 cps | | | | 415 cps | | | |
|---|---|---|---|---|---|---|---|---|---|
|  |  | Resin A | | Industry Standard | # of Samples | Resin B | | Industry Standard | # of Samples |
|  |  | Range | Ave. |  |  | Range | Ave |  |  |
| Lap shear % wood failure | 10 | 65–85 | 72 | 80 | 6 | 55–80 | 60 | 80 | 6 |
| Lap shear (PSI) Dry | 10 | 218–340 | 254 |  | 6 | 235–274 | 255 |  | 6 |
| % wood fail | 20 | 10–50 | 23 | 80 | 6 | 30–100 | 50 | 80 | 6 |
| (PSI) dry | 20 | 222–288 | 242 |  | 6 | 232–300 | 260 |  | 6 |
| % wood failure | 10 | 5–30 | 16 | 80 | 4 | Fail | | 80 | 4 |
| PSI Wet* | 10 | 126–180 | 148 |  | 4 |  |  |  | 4 |
| % wood failure | 20 | 0–5 | 2 | 80 | 4 | Fail | | 80 | 4 |
| PSI Wet* | 20 | 80–164 | 112 |  | 4 |  |  |  | 4 |

|  | Spread Rate g/ft.$^2$ | 1500 cps | | | | 3200 cps | | | |
|---|---|---|---|---|---|---|---|---|---|
|  |  | Resin C | | Industry Standard | # of Samples | Resin D | | Industry Standard | # of Samples |
|  |  | Range | Ave. |  |  | Range | Ave |  |  |
| Lap shear % wood failure | 10 | 60–95 | 72 | 80 | 6 | 65–95 | 74 | 80 | 6 |
| Lap shear (PSI) Dry | 10 | 229–259 | 245 |  | 6 | 136–258 | 193 |  | 6 |
| % wood fail | 20 | 55–95 | 76 | 80 | 6 | 5–85 | 35 | 80 | 6 |
| (PSI) dry | 20 | 264–302 | 273 |  | 6 | 196–266 | 226 |  | 6 |
| % wood failure | 10 | 10–75 | 32 | 80 | 4 | 15–45 | 27 | 80 | 4 |
| PSI Wet* | 10 | 116–138 | 124 |  | 4 | 113–145 | 134 |  | 4 |
| % wood failure | 20 | 2–35 | 11 | 80 | 4 | 10–50 | 25 | 80 | 4 |
| PSI Wet* | 20 | 98–138 | 113 |  | 4 | 122–136 | 127 |  | 4 |

*All wet samples were tested wet after 1 hr. boil

TABLE 4

| GLUE FORMULATION | |
|---|---|
| Resin of Example 4 (42% solids) (A) 160 cps., (B) 415 cps., (C) 1500 cps., (D) 3200 cps | 88.2 grams |
| Wheat flour (filler) | 12.2 grams |
| H$_2$O | 10.8 grams |
| Shell flour | 19.1 grams |
| Resin of Example 4 (42% solids) | 114.6 grams |

The glue components are mixed in the listed order. The resin of Example 4 first is mixed with the wheat flour, then water is added and mixed followed by addition of the shell flour extender and a final mixing of additional resin for most convenient and homogeneous mixing. The viscosity of the resins in the glue formation were varied: 160 cps; 415 cps; 1500 cps and 3200 cps. One hundred and sixty three ply plywood samples were cut from a number of plywood boards made using the

WAFERBOARD MANUFACTURE

Waferboard construction is similar to oriented strand board construction in that a number of discrete fibrous pieces or members, having a thickness of about 20 mils, are adhered together under heat and pressure to form a sheet material having predetermined dimensions. Waferboard, however, is manufactured using wood portions (wafers) having approximately square dimensions (e.g. 2 inch to 2.5 inch squares). No attempt is made to orient the fiber direction when making waferboard. Further, the resin binder (e.g. phenol formaldehyde) is applied in a dry powder form since attempts to completely cover the wafers with a liquid resin have not been effective or have resulted in wafer breakage. Generally, the powdered resin is adhered to the fibrous wafer pieces by first wetting the wafers, such as with a liquid sizing agent, and then contacting the wafers with the dry resin to apply resin discontinuously at a plurality of surface areas on each wafer. When the wafers are hot pressed together, the points or areas of resin adherence act similarly to spot welds to strongly adhere the wafers together and form a sheet material having predetermined dimensions. Industry standards require that waferboard have an internal bond of at least 70 psig; a modulus of rupture of at least 500 psig and a modulus of elasticity of at least 800,000.

The resins of the present invention are suitable for waferboard manufacture, using the resins of the Examples polymerized to a viscosity of for example about 250 to 5000 cps., and spray dried to a powder. Generally the liquid resins of Example 4 are polymerized to a viscosity of 300–3500 cps. having, for example, 6% moisture after spray drying. The wafers are randomly disposed in a press after an initial coating with about 2% by weight liquid sizing agent (e.g. Petrolatum) and the powdered resins applied at a rate of 1–10%, e.g., 2.5% by weight of fibrous wafers. The waferboard samples constructed each have a density of about 30–50 pounds/ft.$^3$ after pressing in a platen press at a temperature of, for example, 400° F. and a pressure of, for example, 500 psig for about five to ten minutes.

I claim:

1. A method of manufacturing a sheet material formed from a plurality of discrete members adhered together, including contacting a plurality of discrete sheet material members with a binding resin; disposing each of said sheet material members in contact with at least one other of said sheet material members and pressing said sheet material members together with sufficient heat and pressure to form a sheet material, the improvement comprising said binding resin, wherein said resin is formed by reacting phenol and formaldehyde with a concentrated wood extract obtained by steam digesting wood chips under alkaline conditions, the weight of concentrated wood extract being from 5% to 50% of the weight of the phenol, calculated on the dry weight basis of each material.

2. The method of claim 1 wherein the concentrated aqueous extract of wood chips contains 45% to 65% solids.

3. The method of claim 2 wherein the concentrated aqueous extract of wood chips is reacted with formaldehyde to produce a prepolymer which is thereafter combined with a phenol-formaldehyde prepolymer and heated until the desired viscosity of the resulting resin is obtained.

4. The method of claim 1 wherein the amount of concentrated aqueous extract of wood chips is about 30–50% of the weight of the phenol.

5. The method of claim 1 wherein said discrete members include cellulosic fibers.

6. The method of claim 1 wherein said discrete members comprise discrete wood pieces.

7. The method of claim 1 wherein said discrete members comprise resin bound fiberglass pieces.

8. In method of manufacturing a sheet material formed from a plurality of discrete members adhered together, including contacting a plurality of discrete sheet material members with a binding resin; disposing each of said sheet material members in contact with at least one other of said sheet material members and pressing said sheet material members together with sufficient heat and pressure to form a sheet material, the improvement comprising said binding resin, wherein said resin is formed by reacting phenol and formaldehyde with a concentrated wood extract obtained by steam digesting wood chips under alkaline conditions, the mole ratio of phenolic compounds to formaldehyde being in the range from 1:2 to 1:3, the weight of concentrated wood extract being from 5% to 50% of the weight of the phenol, calculated on the dry weight basis of each material.

9. A method of manufacturing a cohesive article of a desired configuration comprising contacting a plurality of fibers with a modified phenol-formaldehyde resin and hot pressing said resin contacted fibers together to cause said fibers to adhere to each other wherein said resin is formed by reacting phenol and formaldehyde with a concentrated wood extract obtained by steam digesting wood chips under alkaline conditions, the weight of concentrated wood extract being from 5% to 50% of the weight of the phenol, calculated on the dry weight basis of each material.

10. A method of molding an object having a predetermined configuration from a plurality of smaller objects comprising disposing an object-resin composition in a mold cavity, closing said mold cavity and pressing said composition to adhere said composition together into said predetermined configuration, wherein said object-resin composition comprises a plurality of said smaller objects and a lignosulfonate-phenol-formaldehyde resin formed by reacting phenol and formaldehyde with a concentrated wood extract obtained by steam digesting wood chips under alkaline conditions, the mole ratio of phenolic compounds to formaldehyde being in the range from 1:2 to 1:3, the weight of concentrated wood extract being from 5% to 50% of the weight of the phenol, calculated on the dry weight basis of each material.

11. The method of claim 10 including heating said resin mixture at a temperature not exceeding about 100° C. to form said resin.

12. A method of manufacturing a solid article comprising a plurality of solid members bound with a modified phenol-formaldehyde resin comprising:

heating a mixture of phenol, formaldehyde, wood extract obtained by steam digestion of wood portions and alkali;

reacting said mixture to form a modified phenol-formaldehyde resin;

coating at least a portion of said solid members with said resin; and pressing said solid members together under conditions to adhere said solid members together with said resin and thereby manufacture said solid article.

13. The method of claim 12 wherein said mixture is heated at a temperature of 60° C. to 100° C. and at a pH of 8–13 to form said resin.

14. A method of manufacturing a plywood article including applying a binder comprising a polymer between two layers of wood and pressing said wood layers together under conditions sufficient to adhere said layers together, the improvement comprising said polymer wherein said polymer is formed by reacting phenol and formaldehyde with a concentrated wood extract obtained by steam digesting wood chips under alkaline conditions, the mole ratio of phenolic compounds to formaldehyde being in the range from 1:2 to 1:3, the weight of concentrated wood extract being from 5% to 50% of the weight of the phenol, calculated on the dry weight basis of each material.

15. A plywood article manufactured by applying a binder comprising a polymer between two layers of wood and pressing said wood layers together under conditions sufficient to adhere said layers together, the improvement comprising said polymer wherein said polymer is formed by reacting phenol and formaldehyde with a concentrate wood extract obtained by steam digesting wood chips under alkaline conditions, the weight of concentrated wood extract being from 5% to 50% of the weight of the phenol, calculated on the dry weight basis of each material.

16. A method of manufacturing an oriented strand board including at least partially coating a plurality of wood fiber strand members with a polymeric binder; disposing said coated strand members in contact with at least one other of said strand members; and pressing said wood fiber strand members to adhere said strand members together; the improvement comprising said polymeric binder wherein said polymer is formed by reacting phenol and formaldehyde with a concentrate wood extract obtained by steam digesting wood chips under alkaline conditions, the weight of concentrated wood extract being from 5% to 50% of the weight of the phenol, calculated on the dry weight basis of each material.

17. An oriented strand board manufactured by at least partially coating a plurality of wood fiber strand members with a polymeric binder; disposing said coated strand members in contact with at least one other of said strand members; and pressing said wood fiber strand members to adhere said strand members together; the improvement comprising said polymeric binder wherein said polymer is formed by reacting phenol, formaldehyde, and a concentrated wood extract obtained by steam digesting wood chips under alkaline conditions, the weight of concentrated wood extract being from 5% to 50% of the weight of the phenol, calculated on the dry weight basis of each material.

18. A method of manufacturing a waferboard including binding together a plurality of discrete, relatively thin wood pieces with a polymer binder under pressure sufficient to adhere said wood pieces together into sheet form, the improvement comprising the polymer binder wherein said polymer is formed by reacting phenol, formaldehyde, and a concentrated wood extract obtained by steam digesting wood chips under alkaline conditions, the weight of concentrated wood extract being from 5% to 50% of the weight of the phenol, calculated on the dry weight basis of each material.

19. The method of claim 18 including applying said polymer binder to said wood pieces as a powder having a moisture content of less than about 15% by weight.

20. A waferboard manufactured by binding together a plurality of discrete, relatively thin wood pieces with a polymer binder under pressure sufficient to adhere said wood pieces together into sheet form, the improvement comprising the polymer binder wherein said polymer is formed by reacting phenol, formaldehyde, and a concentrated wood extract obtained by steam digesting wood chips under alkaline conditions, the weight of concentrated wood extract being from 5% to 50% of the weight of the phenol, calculated on the dry weight basis of each material.

* * * * *